US012574986B2

(12) United States Patent
Fujishiro et al.

(10) Patent No.: US 12,574,986 B2
(45) Date of Patent: Mar. 10, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 414 days.

(21) Appl. No.: 18/164,242

(22) Filed: Feb. 3, 2023

(65) Prior Publication Data

US 2023/0180327 A1 Jun. 8, 2023

Related U.S. Application Data

(63) Continuation of application No. PCT/JP2021/029108, filed on Aug. 5, 2021.

(60) Provisional application No. 63/061,887, filed on Aug. 6, 2020.

(51) Int. Cl.
*H04W 76/18* (2018.01)
*H04W 76/27* (2018.01)

(52) U.S. Cl.
CPC ........... *H04W 76/18* (2018.02); *H04W 76/27* (2018.02)

(58) Field of Classification Search
CPC ... H04W 76/18; H04W 76/27; H04W 36/023; H04W 76/19; H04W 76/22; H04W 88/04; H04W 40/22; H04W 36/00
See application file for complete search history.

(56) References Cited

U.S. PATENT DOCUMENTS 10,834,653 B2 11/2020 Xu et al.
2018/0054756 A1 2/2018 Kahtava et al.

2019/0223078 A1 7/2019 Sirotkin et al.
2022/0053370 A1* 2/2022 Zhuo ...................... H04W 28/12
2023/0036769 A1* 2/2023 Wu ........................ H04W 40/34
(Continued)

FOREIGN PATENT DOCUMENTS

JP 2000-004469 A 1/2000
JP 2004-096247 A 3/2004
JP 2015-084601 A 4/2015
(Continued)

OTHER PUBLICATIONS

3GPP TSG-RAN WG3 meeting #106; R3-196992; Source: Huawei; Title: Routing in IAB network; Reno, NV, USA, Nov. 18-22, 2019. (Year: 2019).*

(Continued)

*Primary Examiner* — Mohammed S Chowdhury

(74) *Attorney, Agent, or Firm* — Studebaker Brackett PLLC

(57) ABSTRACT

In a first aspect, a communication control method is a communication control method used in a cellular communication system and includes performing, by a relay node including a user equipment under control of the relay node, connection switching from a first donor base station to a second donor base station, continuing Radio Resource Control (RRC) connection between the user equipment and the first donor base station via the second donor base station after performing of the connection switching, and transmitting, by the first donor base station to the user equipment via the second donor base station by using the RRC connection, a handover command that instructs the user equipment to perform a handover to the second donor base station.

6 Claims, 20 Drawing Sheets

(56) References Cited

U.S. PATENT DOCUMENTS

| | | | | |
|---|---|---|---|---|
| 2023/0139323 A1* | 5/2023 | Ishii | | H04W 48/20 |
| | | | | 455/422.1 |
| 2023/0143694 A1* | 5/2023 | Muhammad | | H04W 36/305 |
| | | | | 370/225 |

FOREIGN PATENT DOCUMENTS

| | | |
|---|---|---|
| JP | 2018-533311 A | 11/2018 |
| WO | 2020/064861 A1 | 4/2020 |
| WO | 2022/086429 A1 | 4/2022 |

OTHER PUBLICATIONS

3GPP TSG-RAN WG3#105bis; R3-195688; Source: ZTE, Sanechips; Title: Discussion on BAP configuration; Chongqing, China, Oct. 14-18, 2019 (Year: 2019).*

Huawei, "Routing in IAB network", 3GPP TSG-RAN WG3 meeting #106, R3-196992, Nov. 18-22, 2019, Reno, NV, USA, pp. 1-8.

"3rd Generation Partnership Project; Technical Specification Group Radio Access Network; NR; NR and NG-RAN Overall Description; Stage 2"; Release 16; 3GPP TS 38.300 V16.2.0 (Jul. 2020); Jul. 2020; pp. 1-6.

Kyocera; "Initial Consideration of Topology Adaptation Enhancements for eIAB"; 3GPP TSG-RAN WG2 #111-e; R2-2007773; Online; Aug. 17-28, 2020; pp. 1-10.

Lg Electronics; "Resolving open issues on BH RLF", 3GPP TSG-RAN WG2 Meeting #109, R2-2001524, Online, Feb. 24-Mar. 6, 2020, pp. 1-3.

CMCC; "Considerations on donor and node routing", 3GPP TSG-RAN WG2 Meeting #107, R2-1909433, Prague, Czech Republic, Aug. 26-30, 2019, pp. 1-3.

Huawei, HiSilicon, OMESH; "Routing function and configuration", 3GPP TSG-RAN WG2 meeting #106, R2-1906064, Reno, USA, May 13-17, 2019, pp. 1-7.

CATT; "Routing selection in IAB", 3GPP TSG RAN WG2 Meeting #106, R2-1905832, Reno, USA, May 13-17, 2019, pp. 1-6.

* cited by examiner

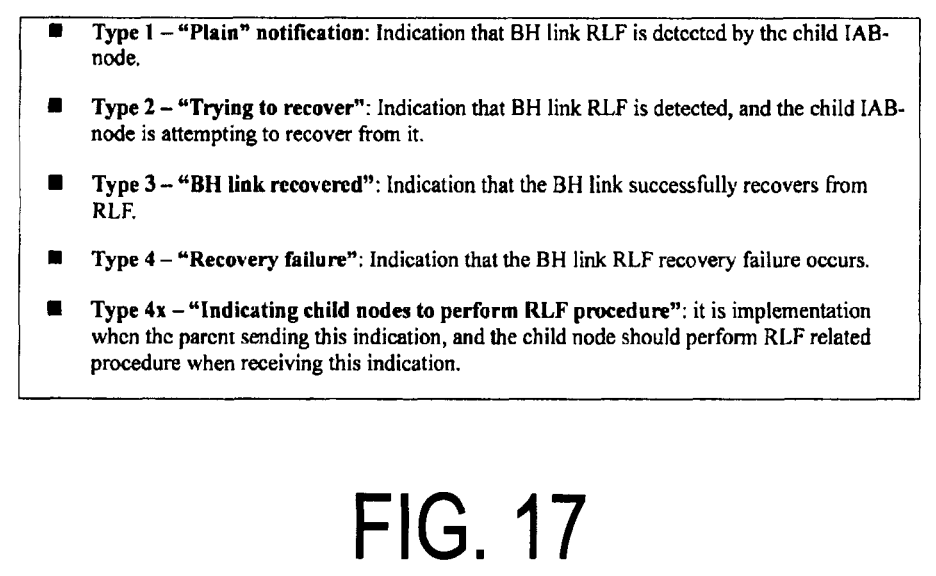

- Type 1 – "Plain" notification: Indication that BH link RLF is detected by the child IAB-node.

- Type 2 – "Trying to recover": Indication that BH link RLF is detected, and the child IAB-node is attempting to recover from it.

- Type 3 – "BH link recovered": Indication that the BH link successfully recovers from RLF.

- Type 4 – "Recovery failure": Indication that the BH link RLF recovery failure occurs.

- Type 4x – "Indicating child nodes to perform RLF procedure": it is implementation when the parent sending this indication, and the child node should perform RLF related procedure when receiving this indication.

FIG. 17

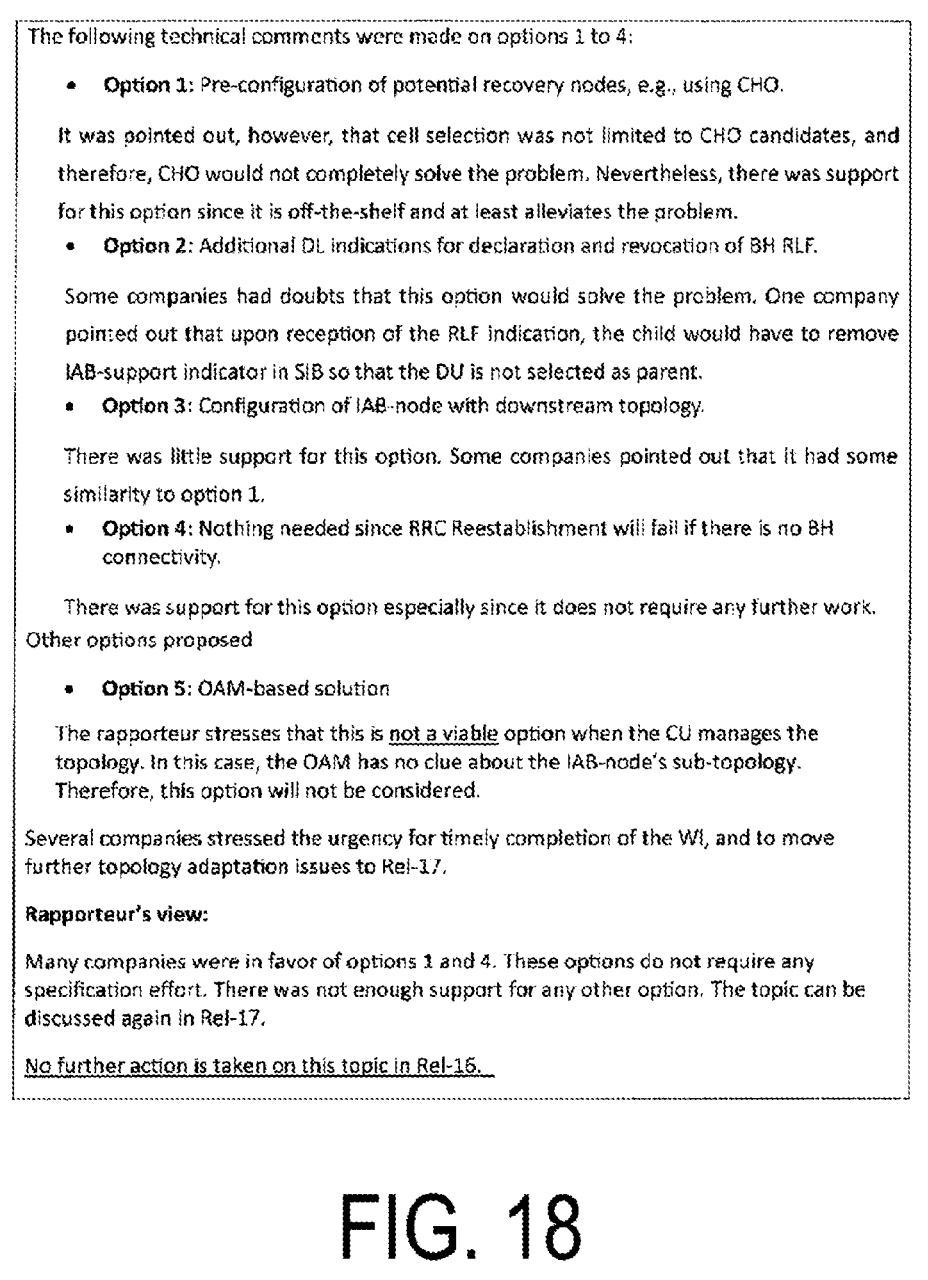

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work. Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

FIG. 18

|  | Modification of PDCP protocol/procedures | Rerouting of PDCP PDUs buffered on intermediate IAB-nodes | Introducing UL status delivery |
|---|---|---|---|
| Applicable to Rel-15 UEs | No | Yes | Yes |
| Signaling overhead | Yes New signaling for triggering data retransmission | Yes New signaling for either deciding whether to discard the buffered data or configuring the forwarding path for the buffered data on the old route. | Yes New signaling for confirming data reception and/or triggering data retransmission. |
| Support of lossless delivery of UL data | Yes | No | Yes |

FIG. 19

| Solution | Descriptions |
|----------|--------------|
| C-1 | Access IAB node delays the sending of RLC ACKs to UE until a confirmation of reception at IAB donor [3, 4, 7]. |
| | When PDCP data recovery / PDCP re-establishment is triggered by RRC, UE retransmits all the PDCP SDUs for which the successful delivery has not been confirmed by lower layers as in the current PDCP specification. |
| | C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4]. |
| | When PDCP data recovery / PDCP re-establishment is triggered by RRC, UE retransmits all the PDCP SDUs for which the successful delivery has not been confirmed by lower layers as in the current PDCP specification. |
| | C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

FIG. 20

COMMUNICATION CONTROL METHOD

RELATED APPLICATIONS

The present application is a continuation based on PCT Application No. PCT/JP2021/029108, filed on Aug. 5, 2021, which claims the benefit of U.S. Patent Application No. 63/061,887 filed on Aug. 6, 2020. The content of which is incorporated by reference herein in their entirety.

TECHNICAL FIELD

The present disclosure relates to a communication control method used in a cellular communication system.

BACKGROUND OF INVENTION

In the 3rd Generation Partnership Project (3GPP), which is a standardization project of a cellular communication system, a new relay node referred to as an Integrated Access and Backhaul (IAB) node is defined (for example, see "3GPP TS 38.300 V16.2.0 (2020 July)"). One or more relay nodes are involved in communication between a base station and a user equipment, and perform relay for the communication.

SUMMARY

In a first aspect, a communication control method is a communication control method used in a cellular communication system and includes selecting, by a relay node that performs data relay from a relay source node to a plurality of relay destination nodes, a data relay destination out of the plurality of relay destination nodes in accordance with a routing configuration configured from a donor base station, and executing, by the relay node, local routing that selects the data relay destination without following the routing configuration when a predetermined condition is satisfied. The predetermined condition includes a condition that a failure occurrence notification has been received from any of the plurality of relay destination nodes.

In a second aspect, a communication control method is a communication control method used in a cellular communication system and includes performing, by a relay node including a user equipment under control of the relay node, connection switching from a first donor base station to a second donor base station, continuing Radio Resource Control (RRC) connection between the user equipment and the first donor base station via the second donor base station after performing of the connection switching, and transmitting, by the first donor base station to the user equipment via the second donor base station by using the RRC connection, a handover command that instructs the user equipment to perform a handover to the second donor base station.

In a third aspect, a communication control method is a communication control method used in a cellular communication system and includes receiving, by a relay node that performs data relay from a relay source node to a plurality of relay destination nodes, capacity information related to data relay capacity of a target relay node included in the plurality of relay destination nodes from the target relay node, and controlling, by the relay node, the data relay based on the capacity information.

In a fourth aspect, a communication control method is a communication control method used in a cellular communication system and includes selecting, by a relay node that performs data relay from a relay source node to a plurality of relay destination nodes, a data relay destination out of the plurality of relay destination nodes in accordance with a routing configuration configured from a donor base station, and transmitting, by the relay node to the donor base station, a routing configuration change request that changes the routing configuration.

In a fifth aspect, a communication control method is a communication control method used in a cellular communication system and includes selecting, by a relay node that performs data relay from a relay source node to a plurality of relay destination nodes, a data relay destination out of the plurality of relay destination nodes in accordance with a routing configuration configured from a donor base station, executing, by the relay node, local routing that selects the data relay destination without following the routing configuration when a predetermined condition is satisfied, and transmitting history information related to the local routing to the donor base station.

BRIEF DESCRIPTION OF THE DRAWINGS

FIG. 17 is a diagram illustrating types of BH RLF notifications.

FIG. 18 is a diagram illustrating identified solutions for avoiding reestablishment to a descendant node.

FIG. 19 is a diagram illustrating a comparison of mechanisms for lossless delivery of UL data in a case of hop-by-hop RLC ARQ.

FIG. 20 is a diagram illustrating options of introduction of UL status delivery.

DESCRIPTION OF EMBODIMENTS

In an embodiment, a cellular communication system will be described with reference to the drawings. In the description of the drawings, the same or similar parts are denoted by the same or similar reference signs.

Configuration of Cellular Communication System

Figure 1:
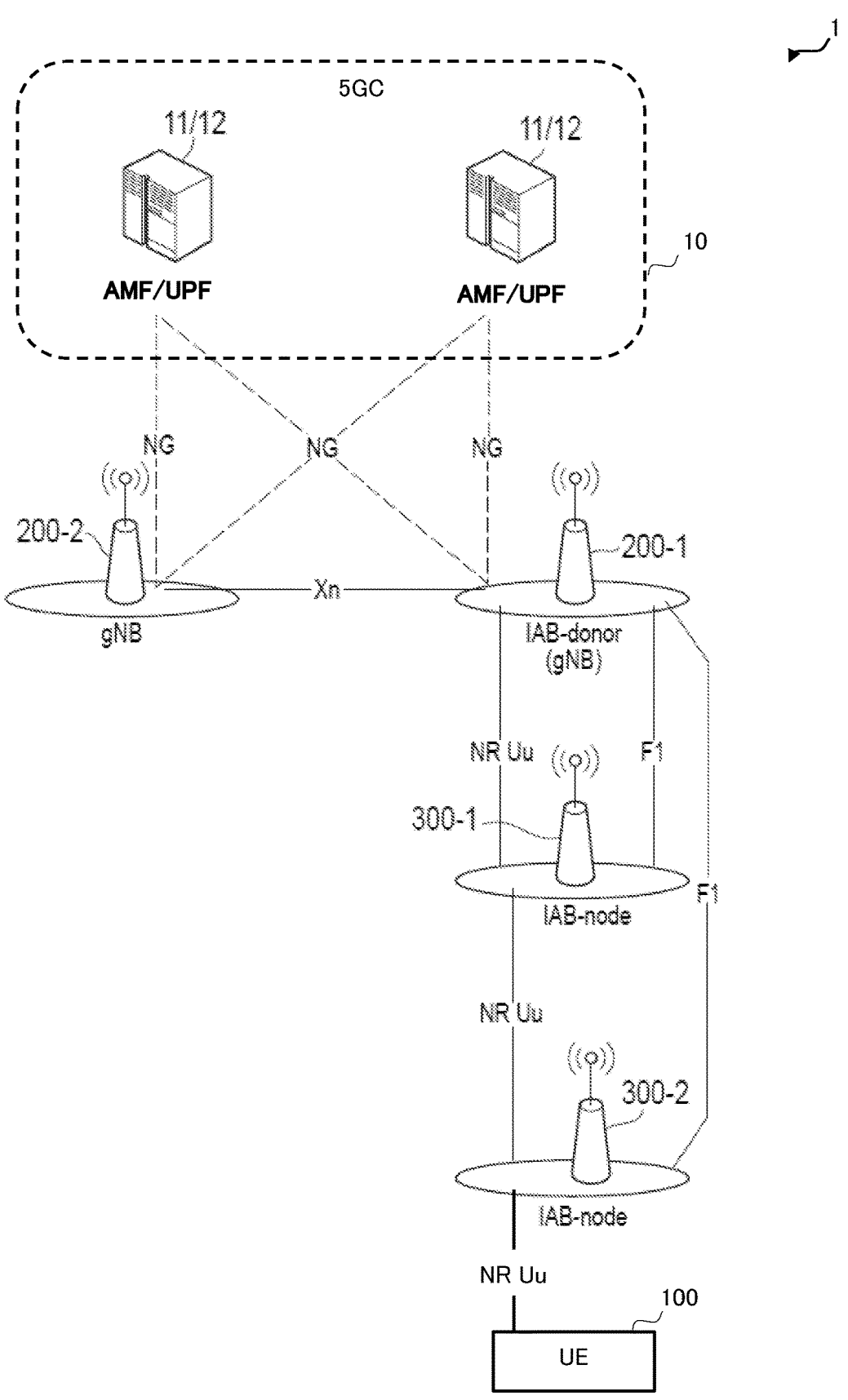
FIG. 1 is a diagram illustrating a configuration of a cellular communication system according to an embodiment.

In an embodiment, a configuration of the cellular communication system will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, a User Equipment (UE) 100, base stations (referred to as gNBs) 200, and IAB nodes 300. Each IAB node 300 is an example of a relay node.

An example in which each base station is an NR base station will be mainly described below. However, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency.

Each gNB 200 is interconnected to the 5GC 10 via an interface referred to as an NG interface. FIG. 1 illustrates two gNBs, namely a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a Central Unit (CU) and a Distributed Unit (DU). The CU and the DU are interconnected via an interface referred to as an F1 interface. The F1 protocol is a communication protocol between the CU and the DU and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a donor base station corresponding to a terminal node of the NR backhaul on the network end and including additional functions that support the IAB. The backhaul can implement multi-hop via a plurality of hops (i.e., a plurality of IAB nodes 300).

FIG. 1 illustrates an example in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor, an apparatus that is provided in the sensor, a vehicle, or an apparatus that is provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
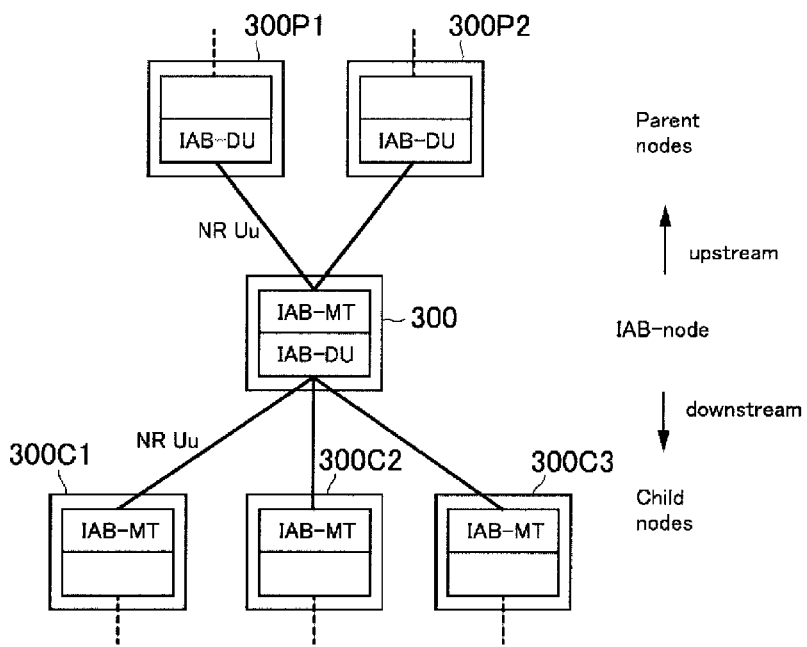
FIG. 2 is a diagram illustrating a relationship between an IAB node, Parent nodes, and Child nodes.

FIG. 2 is a diagram illustrating the relationship between the IAB node 300, the Parent nodes, and the Child nodes.

As illustrated in FIG. 2, each IAB node 300 includes an IAB-DU corresponding to a base station function unit and an IAB-Mobile Termination (MT) corresponding to a user equipment function unit.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link (BH link). FIG. 2 illustrates an example in which the parent nodes of the IAB node 300 are IAB nodes 300P1 and 300P2. Note that the direction toward the parent nodes is referred to as upstream. Seen from the UE 100, upper nodes of the UE 100 can correspond to the parent nodes.

Neighboring nodes on an NR access interface of the IAB-DU (i.e., lower nodes) may be referred to as "child nodes". The IAB-DU manages cells in a manner the same as/or similar to the gNB 200. The IAB-DU terminates the NR Uu wireless interface connected to the UE 100 and the lower IAB nodes. The IAB-DU supports the F1 protocol for the CU of the donor gNB 200-1. FIG. 2 illustrates an example in which the child nodes of the IAB node 300 are IAB nodes 300C1 to 300C3; however, the UE 100 may be included in the child nodes of the IAB node 300. Note that the direction toward the child nodes is referred to as downstream.

Configuration of Base Station

Figure 3:
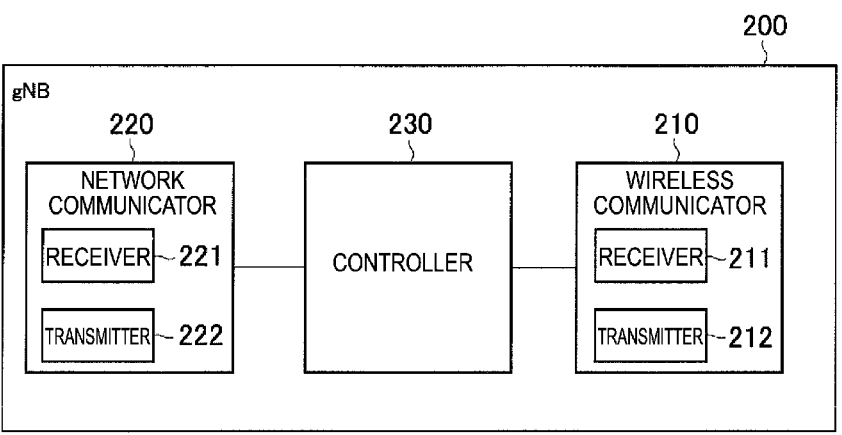
FIG. 3 is a diagram illustrating a configuration of a base station (gNB) according to an embodiment.

In an embodiment, a configuration of the gNB 200 that is a base station will be described. FIG. 3 is a diagram illustrating a configuration of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna, converts a radio signal received by the antenna into a baseband signal (received signal), and outputs the baseband signal to the controller 230. The transmitter 212 performs various types of transmission under control of the controller 230. The transmitter 212 includes an antenna, converts a baseband signal (transmission signal) to be output by the controller 230 into a radio signal, and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from the outside and outputs the received signal to the controller 230. The transmitter 222 performs various types of transmission under control of the controller 230. The transmitter 222 transmits a transmission signal output by the controller 230 to the outside.

The controller 230 performs various types of controls in the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below.

Configuration of Relay Node

Figure 4:
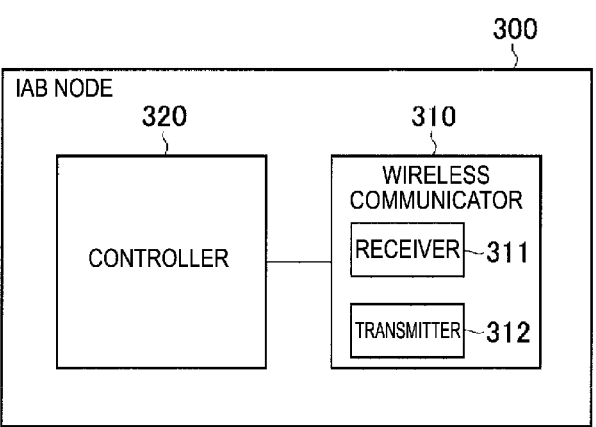
FIG. 4 is a diagram illustrating a configuration of a relay node (IAB node) according to an embodiment.

In an embodiment, a configuration of the IAB node 300 that is a relay node will be described. FIG. 4 is a diagram illustrating a configuration of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna, converts a radio signal received by the antenna into a baseband signal (received signal), and outputs the baseband signal to the controller 320. The transmitter 312 performs various types of transmission under control of the controller 320. The transmitter 312 includes an antenna, converts a baseband signal (transmission signal) to be output by the controller 320 into a radio signal, and transmits the radio signal from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below.

Configuration of User Equipment

Figure 5:
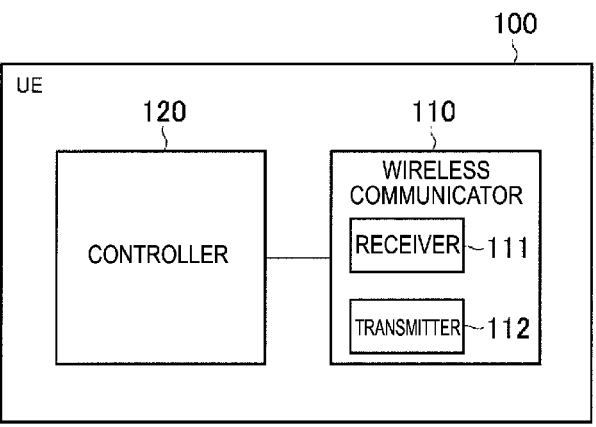
FIG. 5 is a diagram illustrating a configuration of a user equipment (UE) according to an embodiment.

In an embodiment, a configuration of the UE 100 that is a user equipment will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of reception under control of the controller 120. The receiver 111 includes an antenna, converts a radio signal received by the antenna into a baseband signal (received signal), and outputs the baseband signal to the controller 120. The transmitter 112 performs various types of transmission under control of the controller 120. The transmitter 112 includes an antenna, converts a baseband signal (transmission signal) to be output by the controller 120 into a radio signal, and transmits the radio signal from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below.

Configuration of Protocol Stack

Figure 6:
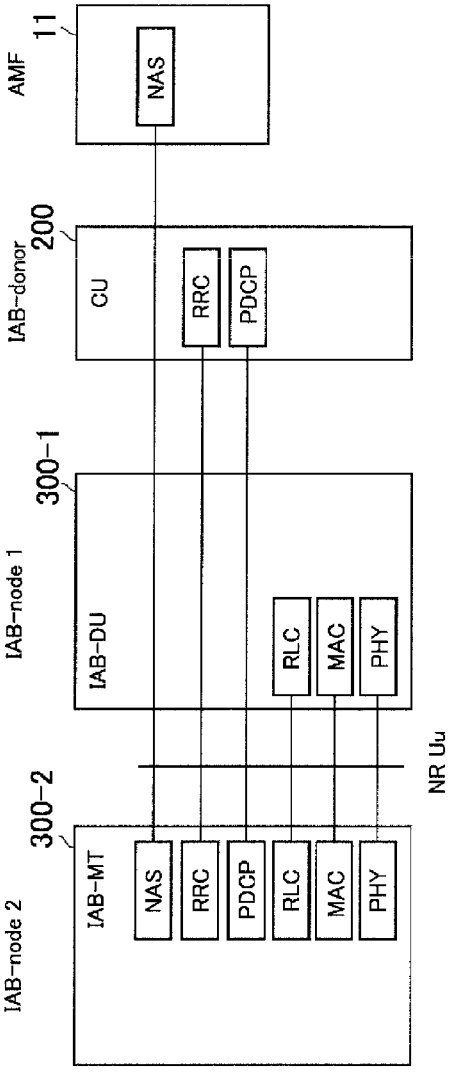
FIG. 6 is a diagram illustrating a protocol stack related to an RRC connection and an NAS connection of an IAB-MT.

In an embodiment, a configuration of a protocol stack will be described. FIG. 6 is a diagram illustrating a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing by hybrid Automatic Repeat Request (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) and resource blocks to be allocated, in the uplink and the downlink.

The RLC layer transmits data to the RLC layer on the reception end by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200 via a radio bearer.

The RRC layer controls a logical channel, a transport channel, and a physical channel depending on establishment, reestablishment, and release of a radio bearer. RRC signaling for various configurations is transmitted between the RRC layer of the IAB-MT of the IAB node 300-2 and the RRC layer of the donor gNB 200. With an RRC connection to the donor gNB 200, the IAB-MT is in an RRC connected state. With no RRC connection to the donor gNB 200, the IAB-MT is in an RRC idle state.

The NAS layer located upper than the RRC layer performs session management, mobility management, and the like. NAS signaling is transmitted between the NAS layer of the IAB-MT of the IAB node 300-2 and the AMF 11.

Figure 7:
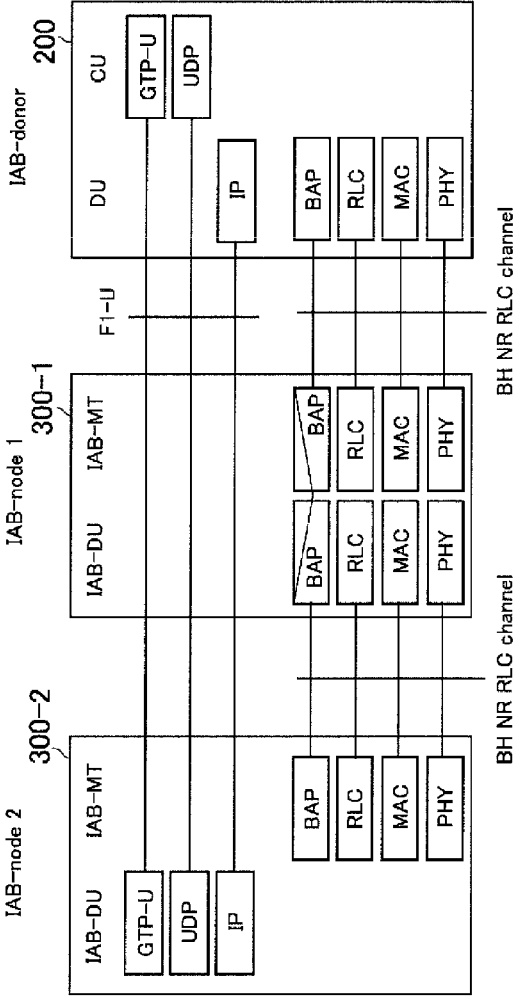
FIG. 7 is a diagram illustrating a protocol stack related to an F1-U protocol.
Figure 8:
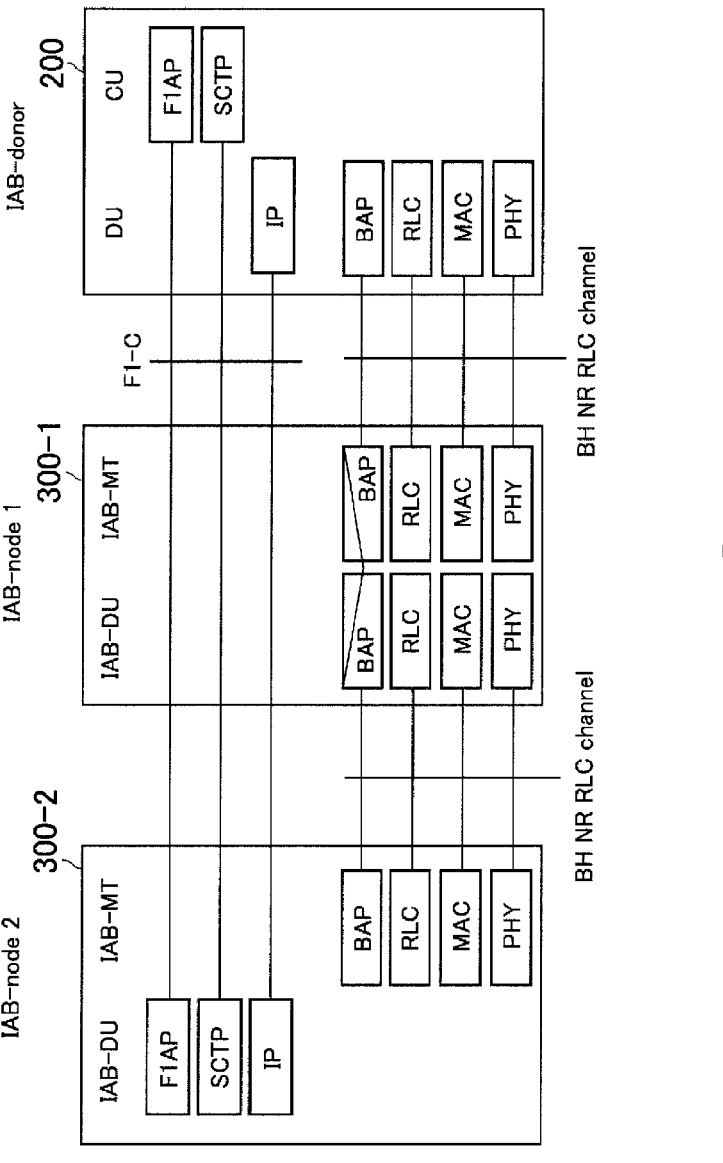
FIG. 8 is a diagram illustrating a protocol stack related to an F1-C protocol.

FIG. 7 is a diagram illustrating a protocol stack related to an F1-U protocol. FIG. 8 is a diagram illustrating a protocol stack related to an F1-C protocol. Here, an example in which the donor gNB 200 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200 includes a Backhaul Adaptation Protocol (BAP) layer as an upper layer of the RLC layer. The BAP layer is a layer that performs routing processing and bearer mapping and demapping processing. In the backhaul, the Internet Protocol (IP) layer is transmitted via the BAP layer to allow routing through a plurality of hops.

In each backhaul link, Protocol Data Units (PDUs) of the BAP layer are transmitted by the backhaul RLC channel (BH NR RLC channel). Configuring a plurality of backhaul RLC channels in each BH link enables the prioritization and Quality of Service (QOS) control of traffic. The association between the BAP PDU and the backhaul RLC channel is performed by the BAP layer of each IAB node 300 and the BAP layer of the donor gNB 200.

As illustrated in FIG. 8, the protocol stack of the F1-C protocol includes an Application Protocol (F1AP) layer and a Stream Control Transmission Protocol (SCTP) layer in place of a GPRS Tunnelling Protocol for User Plane (GTP-U) layer and a User Datagram Protocol (UDP) layer that are illustrated in FIG. 7, respectively.

First Embodiment

Operation of the cellular communication system 1 will be described presupposing the configuration of the cellular communication system 1 as described above.

In the first embodiment, a scenario is assumed in which the IAB node 300 (specifically, the IAB-MT) performs connection switching between the donor gNBs 200. The IAB node 300 may be a mobile IAB node 300. The connection switching refers to a handover or an RRC reestablishment. The handover refers to an operation in which the IAB-MT in the RRC connected state switches cells. The RRC reestablishment refers to an operation in which the IAB-MT in the RRC connected state reconnects with another cell in response to detection of a radio link failure. In the following, an example in which the connection switching is the handover will be described; however, the connection switching may be the RRC reestablishment.

In a scenario in which the IAB node 300 performs connection switching between the donor gNBs 200, operation of the UE 100 under control of the IAB node 300 becomes a problem. Specifically, when the IAB node 300 performs connection switching between the donor gNBs 200, a new operation can be required for the UE 100 under the control of the IAB node 300. However, from the point of view of backward compatibility, making a change to the operation of the UE 100 is not preferable.

The first embodiment is an example that implements the connection switching (for example, the handover) between the donor gNBs 200 in the IAB node 300 only with an operation change on a network end (IAB node side) while being transparent to the UE 100 end. Such a handover may be referred to as an inter-CU handover.

Specifically, in the first embodiment, firstly, the IAB node 300 including the UE 100 under the control of the IAB node 300 performs a handover from a source donor gNB 200S being a first donor base station to a target donor gNB 200T being a second donor base station different from the first donor base station. Secondly, even when the handover is performed, an RRC connection between the UE 100 and the source donor gNB 200S is continued via the target donor gNB 200T. Thirdly, the source donor gNB 200S transmits, to the UE 100 via the target donor gNB 200T by using the RRC connection, a handover command that instructs a handover to the target donor gNB 200T.

In other words, the RRC connection (and PDCP connection) between the UE 100 and the source donor gNB 200 continues in an established state via the target donor gNB 200, and the source donor gNB 200S transmits the handover command to the UE 100 by using the RRC connection. Thus, the handover between the donor gNBs 200 in the IAB node 300 can be implemented without an operation change being made to the UE 100.

In the first embodiment, a data path may be established between the source donor gNB 200S and the target donor gNB 200T. From the handover in the IAB node 300 until completion of the handover in the UE 100, processing to forward data (i.e., data forwarding) of the UE 100 may be performed via the data path. This can suppress loss of data of the UE 100 even when the handover in the IAB node 300 is executed first and the handover in the UE 100 is then performed.

Figure 9:
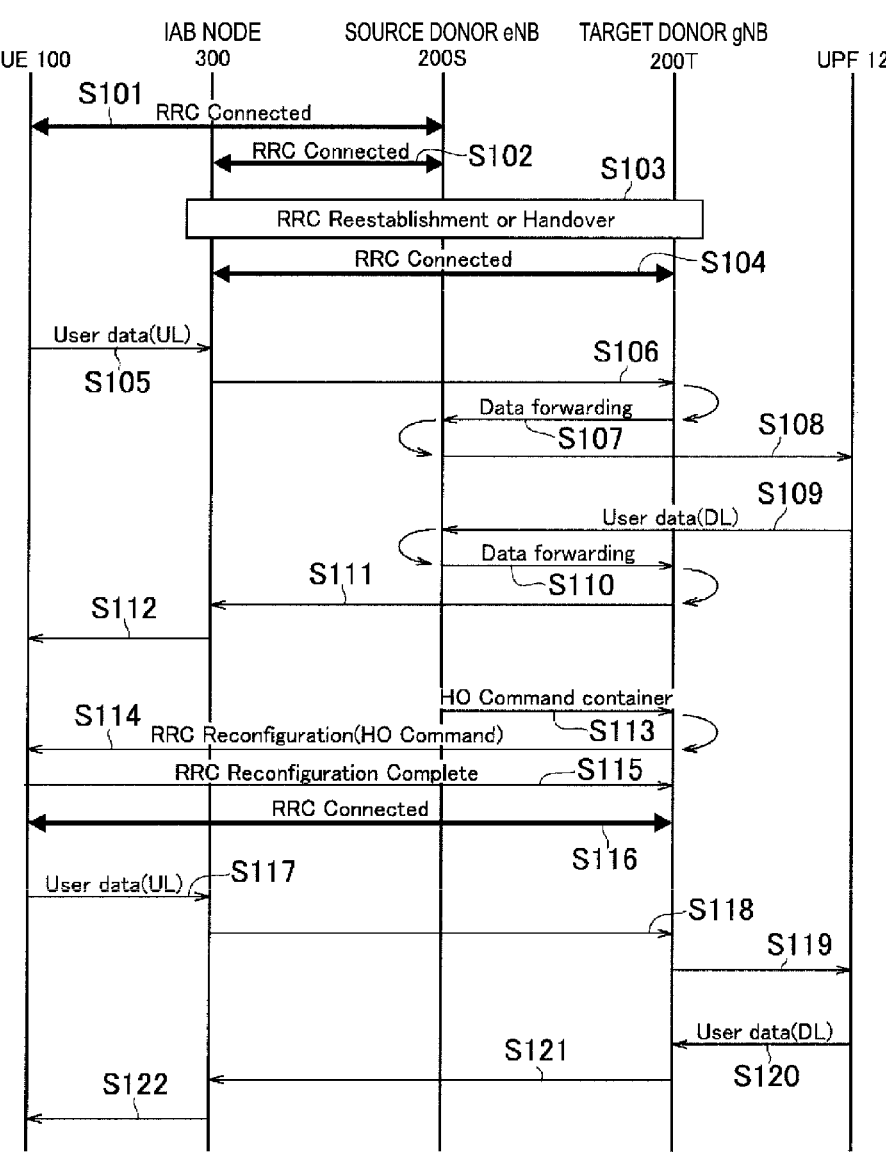
FIG. 9 is a diagram illustrating operation according to a first embodiment.

FIG. 9 is a diagram illustrating operation according to the first embodiment.

As illustrated in FIG. 9, in Step S101, the UE 100 is in a state (RRC connected state) in which the UE 100 has RRC connection established with the source donor gNB 200S.

In Step S102, the IAB node 300 (IAB-MT) is in a state (RRC connected state) in which the IAB node 300 has RRC connection established with the source donor gNB 200S. At least one intermediate IAB node may be present between the IAB node 300 and the source donor gNB 200S. The UE 100 is under the control of the IAB node 300 (IAB-DU). In other words, the UE 100 uses a cell of the IAB node 300 (IAB-DU) as a serving cell of the UE 100.

In Step S103, the IAB node 300 (IAB-MT) performs the RRC reestablishment or the Handover from the source donor gNB 200S to the target donor gNB 200T. Here, description is provided based on the assumption that the IAB node 300 (IAB-MT) performs the handover.

In Step S104, as a result of the handover, the IAB node 300 (IAB-MT) establishes the RRC connection with the target donor gNB 200T.

At this time, the RRC layer and the PDCP layer of the UE 100 are still connected to the source donor gNB 200. Thus, the UE 100 cannot perform communication on neither the C plane nor the U plane with the target donor gNB 200T.

Here, a tunnel (i.e., a path for data forwarding) is formed between the source donor gNB 200S and the target donor gNB 200T. The tunnel may be configured on an inter-base station interface or may be configured via a core network.

In Step S105, the UE 100 transmits uplink User data to the IAB node 300. The IAB node 300 receives the user data.

In Step S106, the IAB node 300 transmits, to the target donor gNB 200T, the user data from the UE 100. The target donor gNB 200T receives the user data.

In Step S107, the target donor gNB 200T forwards the user data received in Step S106 to the source donor gNB 200S (Data forwarding). The source donor gNB 200S receives the user data.

In Step S108, the source donor gNB 200S forwards the user data received in Step S107 to the UPF 12 of the core network.

In Step S109, the source donor gNB 200S receives downlink User data from the UPF 12 of the core network.

In Step S110, the source donor gNB 200S forwards the user data received in Step S109 to the target donor gNB 200T (Data forwarding). The target donor gNB 200T receives the user data.

In Step S111, the target donor gNB 200T forwards the user data received in Step S110 to the IAB node 300. The IAB node 300 receives the user data.

In Step S112, the IAB node 300 transmits (relays) the user data received in Step S111 to the UE 100.

In this manner, transmission and reception of the user data between the UE 100 and the source donor gNB 200S continue via the tunnel between the source donor gNB 200S and the target donor gNB 200T, and the target donor gNB 200T.

In Step S113, the source donor gNB 200S transmits, to the target donor gNB 200T, a handover command (HO Command) that instructs the UE 100 to perform a handover to the target donor gNB 200T via the tunnel between the source donor gNB 200S and the target donor gNB 200T. The target donor gNB 200 receives the handover command.

In Step S114, the target donor gNB 200T transmits, to the UE 100, an RRC message (RRC Reconfiguration) including the handover command received in Step S113. Specifically, the target donor gNB 200T transmits the RRC message to the UE 100 via the IAB node 300. The UE 100 receives the RRC message.

Figure 10:
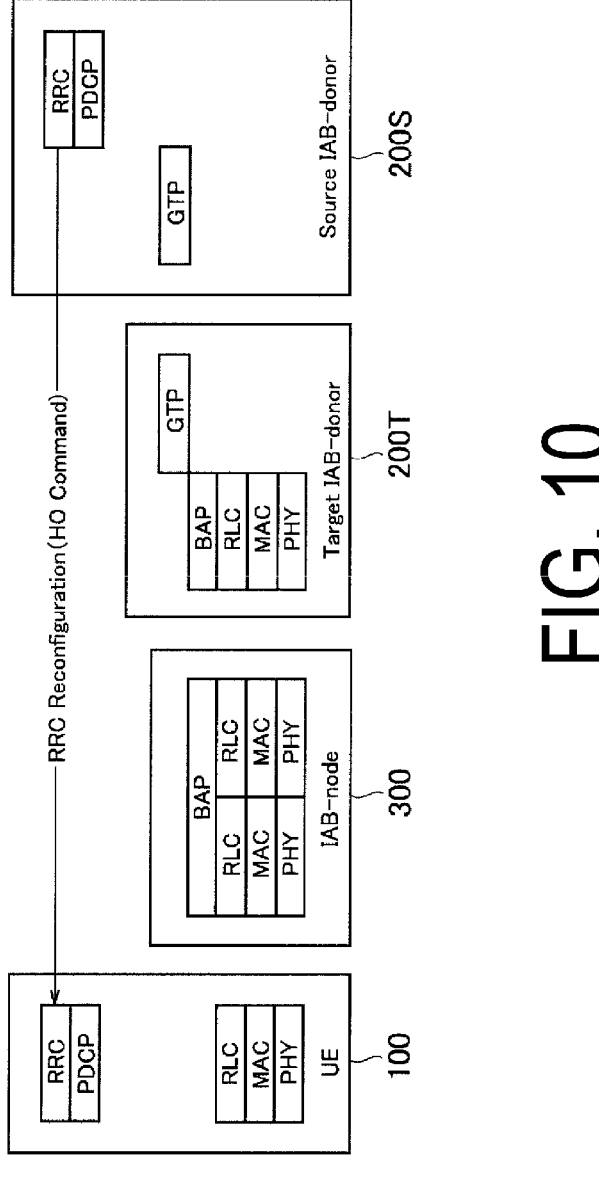
FIG. 10 is a diagram illustrating a protocol stack at a time of a handover command transmission according to the first embodiment.

FIG. 10 is a diagram illustrating a protocol stack at the time of transmission of the handover command. As illustrated in FIG. 10, the handover command (RRC Reconfiguration) is transmitted from the RRC layer of the source donor gNB 200S to the RRC layer of the UE 100 via the target donor gNB 200T and the IAB node 300. Communication between the source donor gNB 200S and the target donor gNB 200T is performed through inter-base station communication. FIG. 10 illustrates an example using GTP, but the embodiment is not limited to this. For example, Xn-AP may be used, and in this case, the handover command is included (encapsulated) in an RRC container of an Xn-AP message to be transmitted.

With reference to FIG. 9 again, in Step S115, in response to the handover command, the UE 100 transmits, to the target donor gNB 200T, an RRC message (RRC Reconfiguration Complete) indicating completion of the handover. Specifically, the UE 100 transmits the RRC message to the target donor gNB 200T via the IAB node 300. The target donor gNB 200T receives the RRC message. Here, the UE 100 continues to be under the control of the IAB node 300, and thus a RACH-less handover, in which transmission of a random access preamble and reception of a random access response are omitted, may be performed. In this case, in the handover command, the RACH-less handover may be instructed to the UE 100.

In Step S116, as a result of the handover, the UE 100 establishes RRC connection with the target donor gNB 200T. From this time, the user data of the UE 100 is switched to communication with the target donor gNB 200T.

In Step S117, the UE 100 transmits uplink User data to the IAB node 300. The IAB node 300 receives the user data.

In Step S118, the IAB node 300 transmits the user data received in Step S117 to the target donor gNB 200T. The target donor gNB 200T receives the user data.

In Step S119, the target donor gNB 200T forwards the user data received in Step S118 to the UPF 12 of the core network.

In Step S120, the target donor gNB 200T receives downlink User data from the UPF 12 of the core network.

In Step S121, the target donor gNB 200T forwards the user data received in Step S120 to the IAB node 300. The IAB node 300 receives the user data.

In Step S122, the IAB node 300 transmits (relays) the user data received in Step S121 to the UE 100.

Second Embodiment

A second embodiment will be described regarding mainly the differences from the embodiment described above.

The second embodiment is an embodiment related to load balancing in IAB topology. In the IAB node 300, the path in the IAB topology is basically determined in a semi-fixed manner based on a routing table (a BAP routing ID and a path ID), and the CU of the donor gNB 200 collectively manages the routing table. However, efficient use of a plurality of paths may enable more dynamic load balancing.

In the second embodiment, the IAB node 300 performs efficient data relay in consideration of data relay capacity of each of a plurality of relay destination nodes (a plurality of paths). Specifically, in the second embodiment, the IAB node 300 that performs data relay from a relay source node to a plurality of relay destination nodes receives capacity information related to data relay capacity of a target IAB node 300 included in the plurality of relay destination nodes. Then, the IAB node 300 controls data relay based on the received capacity information.

The capacity information may include information indicating whether a plurality of nodes are present in the next hop of the target IAB node 300 included in the plurality of relay destination nodes. When the plurality of nodes are present in the next hop of the target IAB node 300, the target IAB node 300 can be considered to have a large data relay capacity. Thus, preferentially relaying data to such a target IAB node 300 allows a plurality of paths to be efficiently used.

The IAB node 300 may receive the capacity information related to each of the plurality of relay destination nodes and control a data transmission ratio for each of the plurality of relay destination nodes based on the received capacity information. For example, the IAB node 300 relays more data to relay destination nodes having larger data relay capacity and relays less data to other relay destination nodes having smaller data relay capacity.

As described above, the IAB node 300 selects a data relay destination out of the plurality of relay destination nodes in accordance with a routing configuration (routing table) configured from the donor gNB 200. When a predetermined condition is satisfied, the IAB node 300 may execute local routing that selects the data relay destination without following the routing configuration. Here, the predetermined condition may include a condition that a failure occurrence notification or a local routing request has been received from any of the plurality of relay destination nodes.

As described above, basically, the IAB node 300 performs routing in accordance with the configuration from the donor gNB 200S, and in a case of occurrence of a failure in the relay destination node or occurrence of a request from the relay destination node, the IAB node 300 itself performs local routing. In this manner, the IAB node 300 can relay data to an appropriate relay destination node depending on a situation.

(1) Upstream Relay Operation

In the second embodiment, an upstream relay operation will be described.

Figure 11:
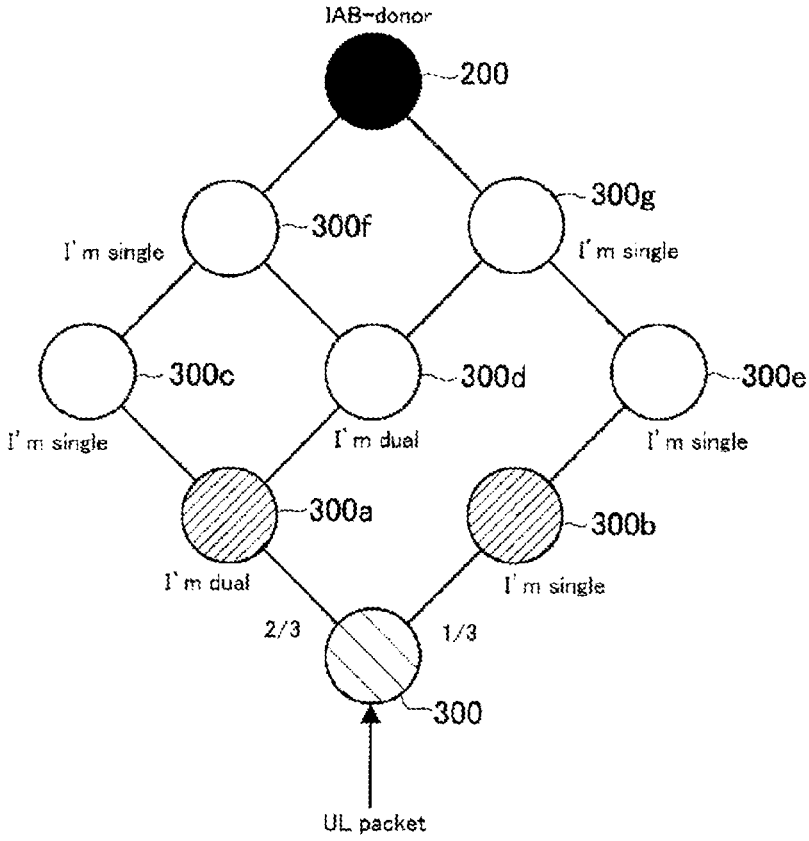
FIG. 11 is a diagram for illustrating upstream relay operation according to a second embodiment.

FIG. 11 is a diagram for illustrating upstream relay operation according to the second embodiment. In the upstream relay operation, the relay source node of the IAB node 300 is a child node of the IAB node 300, and the relay destination node of the IAB node 300 is a parent node of the IAB node 300.

As illustrated in FIG. 11, IAB topology including the IAB node 300, other IAB nodes 300a to 300g, and the donor gNB 200 is formed. The IAB node 300 receives an uplink packet (UL packet) from its child node (which can be the UE 100). The IAB node 300 relays the received uplink packet to the IAB node 300a and/or the IAB node 300b, each being a parent node, based on a routing configuration configured from the donor gNB 200 and information (BAP routing ID) included in a header of the uplink packet.

Each of the IAB nodes 300a to 300g transmits, to the child node, information indicating whether a plurality of nodes in the next hop of each of the IAB nodes 300a to 300g, as capacity information of each of the IAB nodes 300a to 300g. In the upstream relay operation, such capacity information is referred to as "BH connection information". Specific examples of the BH connection information will be described below. With the IAB node 300 transmitting such BH connection information to its child node, the child node can recognize potential capacity of its parent node, and thus efficient data relay can be performed at the time of local routing.

A BH a node of which includes one next hop node is referred to as a "single BH", and a BH a node of which includes two next hop nodes is referred to as a "dual BH". In the example of FIG. 11, each of the IAB nodes 300b, 300c, 300e, 300f, and 300g is the single BH. In contrast, each of the IAB nodes 300a and 300d is the dual BH, which can be considered to have larger data relay capacity than the single BH. Note that, for the dual BH, duplex connection may be established by means of dual connectivity.

For example, the IAB node 300 determines the transmission ratio based on the BH connection information of the parent nodes (IAB nodes 300a and 300b). Because the IAB node 300a is the dual BH and the IAB node 300b is the single BH, a total number of BH links of the parent nodes is 3. Thus, when the IAB node 300 performs local routing, the IAB node 300 configures the transmission ratio for the IAB node 300a to "⅔" and configures the transmission ratio for the IAB node 300b to the remaining "⅓". Note that the transmission ratio for a certain parent node may be configured to zero. In this case, the determination of the transmission ratio can be considered to be path selection (path switching).

Figure 12:
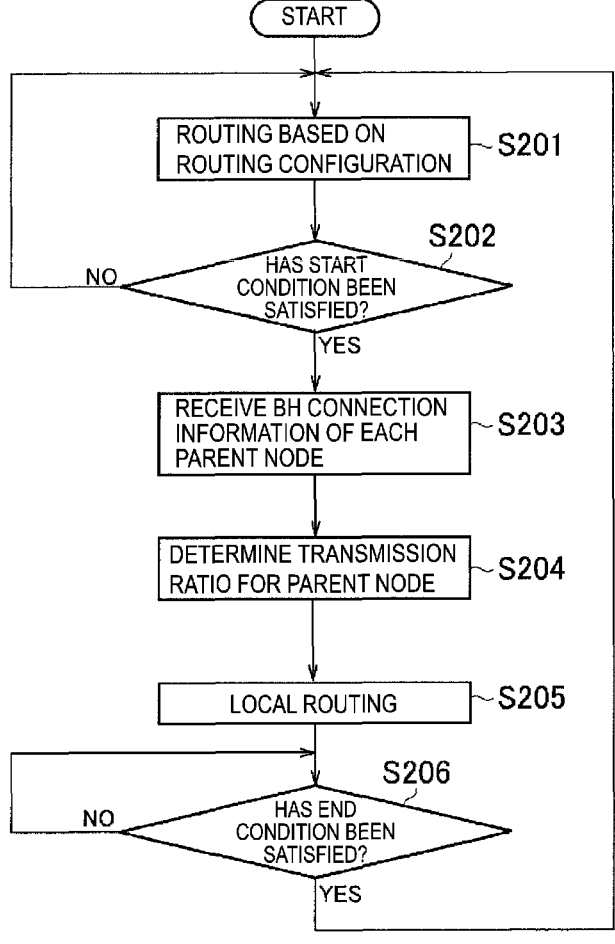
FIG. 12 is a diagram illustrating the upstream relay operation according to the second embodiment.

FIG. 12 is a diagram illustrating the upstream relay operation according to the second embodiment. The operation may be executed by the IAB node 300, and at least a part of the operation may be executed by the BAP layer and/or the IAB-MT.

As illustrated in FIG. 12, in Step S201, the IAB node 300 performs routing based on the routing configuration configured from the donor gNB 200.

In Step S202, the IAB node 300 determines whether a start condition of the local routing has been satisfied. For example, the start condition is one of the following. A parameter (threshold or the like) for defining the start condition may be configured from the donor gNB 200 to the IAB node 300.

A condition that a BH failure occurrence notification has been received from the parent node:

For example, the BH failure occurrence notification in the parent node is transmitted from the parent node to the IAB node 300 on a BHRLF Indication being a message of the BAP layer. The BH failure occurrence notification may be a notification indicating that a Radio Link Failure (RLF) has occurred in the BH of the parent node, may be a notification indicating that the parent node is in the middle of processing of recovering from the RLF of the BH, or may be a notification indicating failure in recovery from the RLF of the BH of the parent node.

A condition that an uplink throughput to a certain parent node has fallen to or below a certain value:

For example, a case in which scheduling requests (SRs) transmitted from the IAB node 300 to a certain parent node have been ignored a certain number of times or more (for example, no uplink grants are returned) may fall under the condition. A case in which uplink throughputs of parent nodes are compared and a certain difference (deviation) or greater has occurred between the uplink throughputs within a certain past period (and a case in which the state continued for a certain period or longer) may fall under the condition. A case in which an uplink throughput of a certain parent node has fallen to or below a certain value (and a case in which the state continued for a certain period or longer) may fall under the condition.

A condition that a local routing request has been received from the parent node:

The local routing request may be transmitted from the parent node on a message of the BAP layer. The local routing request may be transmitted from the donor gNB 200 on an F1 message or an RRC message via the parent node. The IAB node 300 may transmit a response to the local routing request from the parent node or may notify the parent node of the transmission ratio to be described below.

The local routing request may include an identifier of a target bearer (or an RLC channel or a logical channel) to be subjected to the local routing. The IAB node 300 performs the local routing on the target bearer (or the RLC channel or the logical channel) and does not perform the local routing on a non-target bearer (or the RLC channel or the logical channel) (i.e., performs routing on the non-target bearer in accordance with the routing table).

A condition that an uplink buffer amount of the IAB node 300 or its child node has reached or exceeded a certain value (and the state continued for a certain period or longer):

For example, the IAB node 300 can recognize the uplink buffer amount of the child node based on a buffer status report (BSR) received from the child node. The BSR may take an uplink buffer amount of a child node (i.e., a grand-child node) of the child node into consideration. A case in which the uplink buffer amount indicated by the BSR has reached or exceeded a certain value (and a case in which the state continued for a certain period or longer) may fall under the condition.

If the start condition of the local routing is not satisfied (Step S202: No), the IAB node 300 continues routing based on the routing configuration configured from the donor gNB 200 (Step S201).

In contrast, if the start condition of the local routing is satisfied (Step S202: Yes), the IAB node 300 starts operation related to the local routing. Note that, only when execution of the local routing is permitted by the donor gNB 200, the IAB node 300 may be able to execute the local routing. The permission is performed by using a message of the BAP layer (BAP Control PDU), system information (SIB1), RRC Reconfiguration, or the like. Whether the local routing can be executed may be configured for each bearer (RLC channel) or may be collectively configured for all of the bearers. Together with such a configuration, which one of the above conditions is to be applied and a threshold used for determination of the condition may be configured.

In Step S203, the IAB node 300 receives the BH connection information of each parent node. Note that Step S203 may be performed before Step S202.

The BH connection information of the parent node may include information indicating whether the parent node is the single BH or the dual BH (or a triple BH). The BH connection information of the parent node may include a numerical value indicating the number of BHs of the parent node. The BH connection information may further include information related to capacity of each BH link. For example, the information related to capacity of each BH link may be information indicating at least one selected from the group consisting of a bandwidth, the number of component carriers, and a frequency band of each BH link, or may be information indicating an average throughput (or a maximum throughput, or a Guaranteed Bit Rate (GBR)) of each BH link.

The BH connection information may be transmitted from the parent node to the IAB node 300. For example, the BH connection information may be an information element included in the BAP Control PDU or the system information (for example, SIB1) transmitted by the parent node. The parent node may transmit the BH connection information when the parent node is the dual BH (or the triple BH) and may not transmit the BH connection information when the parent node is the single BH. The IAB node 300 distinguishes the single BH and the dual BH, depending on present or absent of transmission of the BH connection information.

Alternatively, the BH connection information may be transmitted from the donor gNB 200 to the IAB node 300. The BH connection information may be an information element included in the RRC message (for example, RRC Reconfiguration) or the F1 message (for example, DL Information Transfer) transmitted by the donor gNB 200.

In Step S204, the IAB node 300 determines an uplink packet transmission ratio based on the BH connection information received in the Step S203. As in the example described above, when one parent node is the dual BH and the other parent node is the single BH, the IAB node 300 configures the transmission ratio for the one parent node to "⅔" and configures the transmission ratio for the other parent node to "⅓". Here, for example, when the transmission ratio is configured to 0:1, a transmission destination is considered to have been switched (local switching has been performed). The IAB node 300 may adjust or determine the transmission ratio, based on information included in the BH connection information (for example, information related to capacity of each BH link). The IAB node 300 may adjust or determine the transmission ratio, based on a throughput history of previous transmission to each parent node (or a history of uplink grant to the child node (i.e., a reception throughput)).

In Step S205, the IAB node 300 performs the local routing of the uplink packet based on the transmission ratio determined (and adjusted) in Step S204. The IAB node 300 may change a header of the uplink packet subjected to the local routing. For example, in a BAP header, the routing ID may be changed, and an identifier indicating that the local routing has been performed may be provided.

In Step S206, the IAB node 300 determines whether an end condition of the local routing has been satisfied. The end condition can be a condition opposite to the start condition described above. For example, the end condition is at least one selected from the group consisting of a condition that a BH recovery success notification has been received from the parent node, a condition in which a throughput to a certain parent has been recovered, a condition that a local routing stop request has been received, and a condition that a buffer status of the child node (and the grandchild node) has been improved. The end condition may include a condition that local routing permission has been cancelled (configured to "unpermitted") by the donor gNB 200.

When the end condition of the local routing is not satisfied (Step S206: No), the IAB node 300 continues the local routing (Step S205). In contrast, when the end condition of the local routing is satisfied (Step S206: Yes), the IAB node 300 performs routing based on the routing configuration configured from the donor gNB 200 (Step S201).

(2) Downstream Relay Operation

In the second embodiment, a downstream relay operation will be described.

Figure 13:
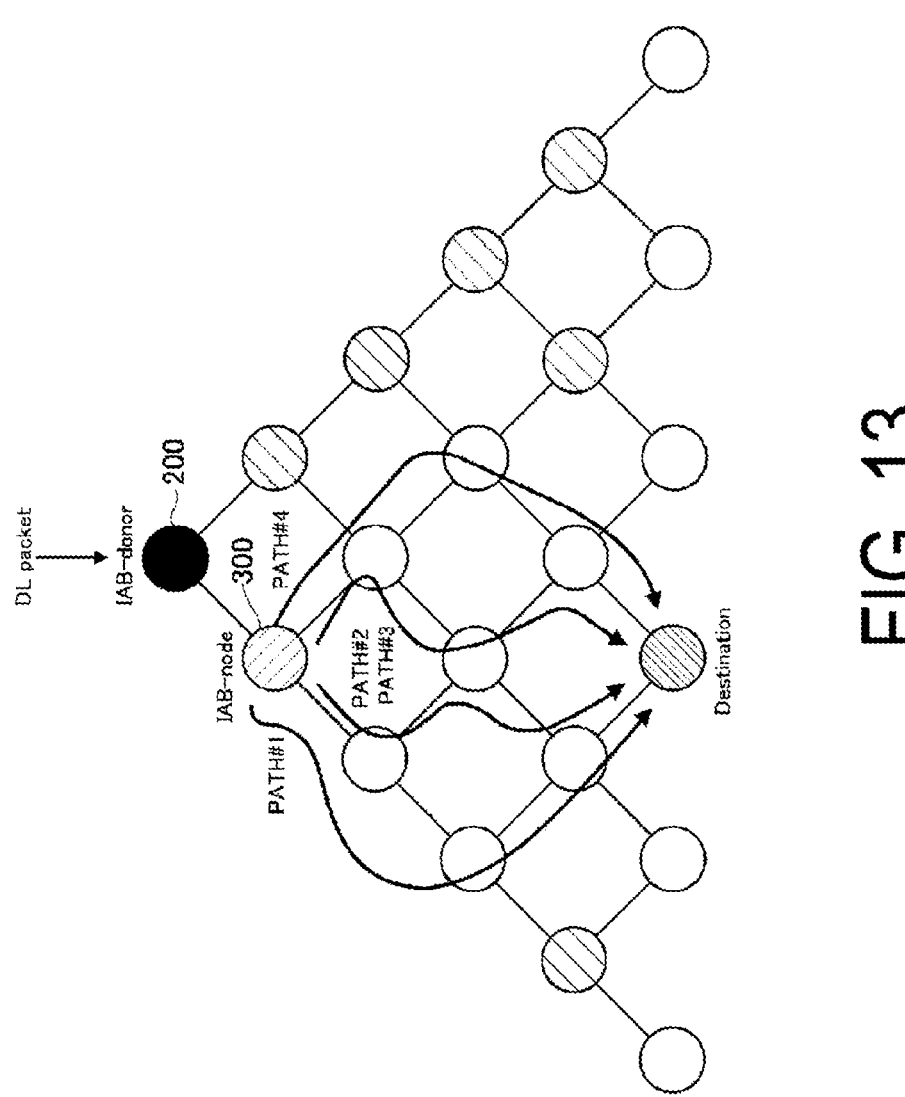
FIG. 13 is a diagram for illustrating downstream relay operation according to the second embodiment.

FIG. 13 is a diagram for illustrating downstream relay operation according to the second embodiment. In the downstream relay operation, the relay source node of the IAB node 300 is a parent node of the IAB node 300, and the relay destination node of the IAB node 300 is a child node of the IAB node 300. In the downstream relay operation, the parent node and the child node in the upstream relay operation described above are replaced with each other. Note that FIG. 13 illustrates an example in which each IAB node 300 is the dual BH, and four paths are present between the IAB node 300 and a destination node (Destination).

Figure 14:
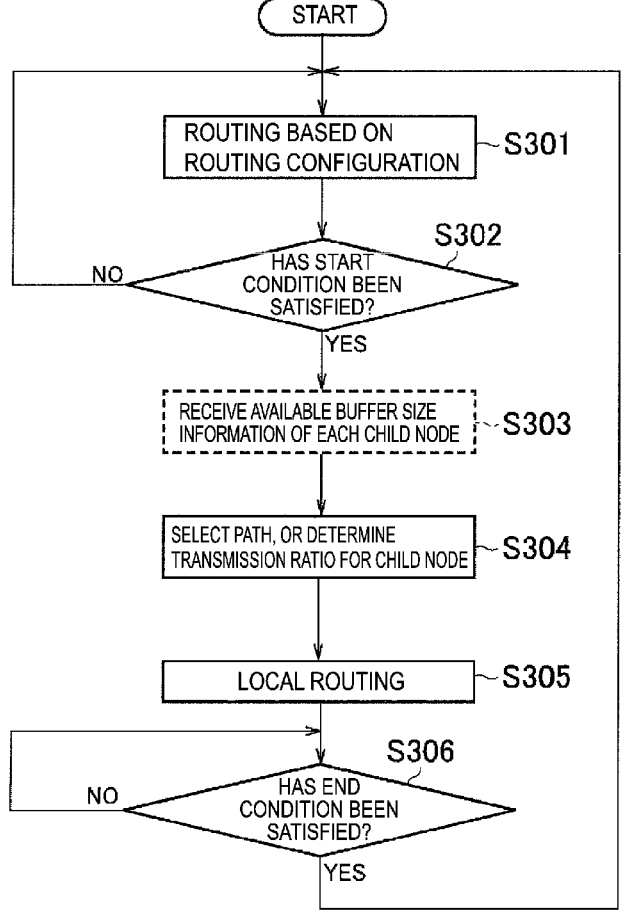
FIG. 14 is a diagram illustrating the downstream relay operation according to the second embodiment.

FIG. 14 is a diagram illustrating the downstream relay operation according to the second embodiment. The operation may be executed by the IAB node 300, and at least a part of the operation may be executed by the BAP layer and/or the IAB-DU. Here, differences from the upstream relay operation will be mainly described.

As illustrated in FIG. 14, in Step S301, the IAB node 300 performs routing based on the routing configuration configured from the donor gNB 200.

In Step S302, the IAB node 300 determines whether a start condition of the local routing has been satisfied. For example, the start condition is one of the following. A parameter (threshold or the like) for defining the start condition may be configured from the donor gNB 200 to the IAB node 300. The IAB node 300 may be able to execute the local routing only when the local routing is permitted (configured) by the donor gNB 200. The permission may be performed by using an F1 message (F1AP), an RRC message, or a BAP message. The permission may be configured for each bearer (RLC channel) or may be collectively configured for all of the bearers. The permission may be an instruction. Which condition of the following conditions is to be applied and a threshold used for determination of the condition may be configured.

A condition that a throughput of a certain path has fallen to or below a certain value (and the state continued for a certain period or longer):

A condition that a radio state of a certain child node has deteriorated (and the state continued for a certain period or longer):

For example, the IAB node 300 may determine the radio state based on a measurement report from the child node and/or a scheduling result (MCS or the like) for the child node.

A condition that an available buffer size of a certain child node has fallen below a certain value (and the state continued for a certain period or longer):

For example, the IAB-DU of the IAB node 300 transmits a Flow control polling BAP Control PDU to the child node and receives a Flow control feedback BAP Control PDU from the child node. Then, the IAB node 300 (IAB-DU) identifies an available buffer size (available buffer amount) indicated by the Flow control feedback BAP Control PDU and performs determination.

When the start condition of the local routing is not satisfied (Step S302: No), the IAB node 300 continues routing based on the routing configuration configured from the donor gNB 200 (Step S301).

In contrast, when the start condition of the local routing is satisfied (Step S302: Yes), the IAB node 300 starts operation related to the local routing. The IAB node 300 may select different paths having the same Destination out of the routing configuration and transmit a downlink packet to the IAB nodes corresponding to the paths. The IAB node 300 may change the header of the downlink packet subjected to the local routing. For example, in a BAP header, the routing ID may be changed, and an identifier indicating that the local routing has been performed may be provided.

In Step S303, the IAB node 300 may receive available buffer size information from each child node.

In Step S304, the IAB node 300 selects downstream paths and/or determines the transmission ratio for the child nodes. Specifically, the IAB node 300 selects other paths having the same destination out of the stored routing configuration. The IAB node 300 may select a plurality of paths, and in this case, the IAB node 300 may determine the transmission ratio in a manner the same as, and/or similar to the upstream relay operation described above. Combinations of selectable paths may be configured in advance from the donor gNB 200 to the IAB node 300.

In Step S305, the IAB node 300 performs the local routing according to the result of Step S304.

In Step S306, the IAB node 300 determines whether an end condition of the local routing has been satisfied. The end condition can be a condition opposite to the start condition described above. For example, the end condition is at least one selected from the group consisting of a condition that a throughput of a certain path has recovered to or above a certain value, a condition that a radio state of the child node has recovered to or above a certain value, and a condition that an available buffer size of the child node has recovered to or above a certain value. The end condition may include a condition that local routing permission has been cancelled (configured to "unpermitted") by the donor gNB 200.

When the end condition of the local routing is not satisfied (Step S306: No), the IAB node 300 continues the local routing (Step S305). In contrast, when the end condition of the local routing is satisfied (Step S306: Yes), the IAB node 300 performs routing based on the routing configuration configured from the donor gNB 200 (Step S301).

Variation 1 of Second Embodiment

Variation 1 of the second embodiment will be described regarding mainly the differences from the embodiment described above.

In the second embodiment described above, the donor gNB 200 may not be able to recognize details of the local routing executed by the IAB node 300 (when the local routing has been executed and how many times the local routing has been executed). When the local routing is executed, the routing configuration configured by the donor gNB 200 may have a defect, or a failure may have occurred in the IAB topology. Thus, the donor gNB 200 is preferable to be able to recognize the details of the local routing. With this, for example, the donor gNB 200 can optimize the routing configuration.

In the present variation, the IAB node 300 that performs data relay from the relay source node to a plurality of relay destination nodes selects a data relay destination out of the plurality of relay destination nodes in accordance with a routing configuration configured from the donor gNB 200. When a predetermined condition is satisfied, the IAB node 300 executes local routing that selects the data relay destination without following the routing configuration (see the second embodiment). The IAB node 300 transmits history information related to the local routing (i.e., information indicating the details of the local routing) to the donor gNB 200.

Figure 15:
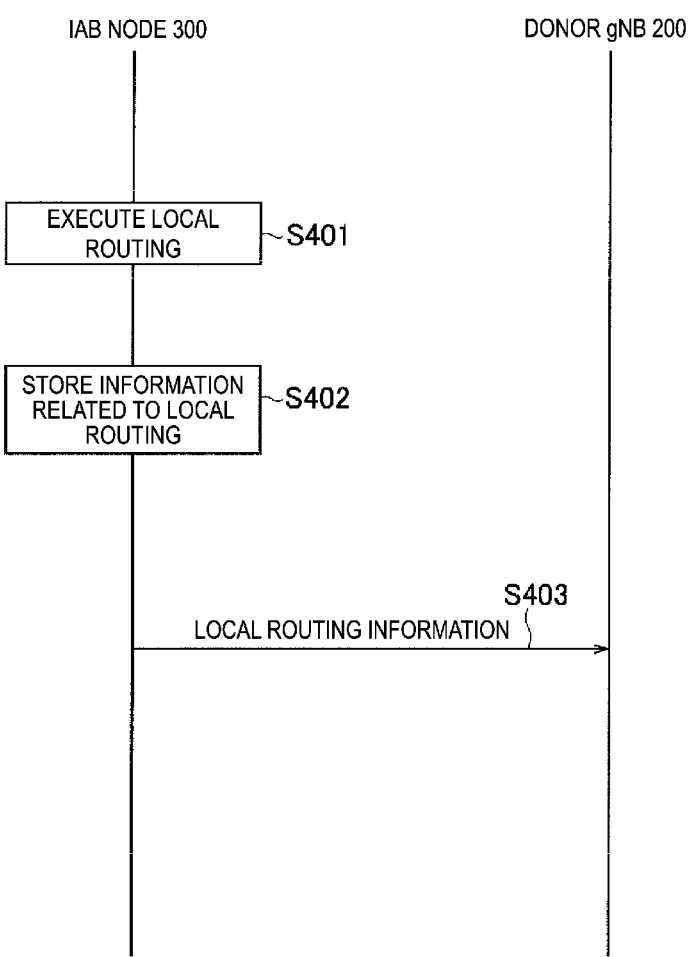
FIG. 15 is a diagram illustrating operation of variation 1 of the second embodiment.

FIG. 15 is a diagram illustrating operation of Variation 1 of the second embodiment.

As illustrated in FIG. 15, in Step S401, the IAB node 300 performs local routing.

In Step S402, the IAB node 300 stores information (local routing information) related to the local routing executed in Step S401. The IAB node 300 stores the local routing information every time the IAB node 300 performs local routing.

The local routing information may include at least one selected from the group consisting of a time stamp indicating time of execution of the local routing, position information (latitude, longitude, and altitude) indicating place of execution of the local routing, and information indicating a radio state at the time of execution of the local routing. The local routing information may include routing IDs (path IDs and Destinations) before and after being changed due to the local routing. The local routing information may include a topology ID (which may be a donor gNB ID or a gNB-CU ID) of the IAB topology being connected. The local routing information may include information indicating a reason (or a condition) for executing the local routing. The local routing information may include information indicating a period (start time, end time) during which the local routing has been performed and/or the number of times the local routing has been performed. Note that the local routing information may be stored in the BAP layer or may be reported from the BAP layer to the RRC layer on each occasion and then stored in the RRC layer.

In Step S403, the IAB node 300 transmits, to the donor gNB 200, the local routing information stored in Step S402. The local routing information is transmitted from the IAB node 300 on an RRC message, for example. The local routing information may be transmitted as a response message in response to a request from the donor gNB 200. For example, the local routing information may be transmitted as UE Information Response for UE Information Request.

Variation 2 of Second Embodiment

Variation 2 of the second embodiment will be described regarding mainly the differences from the embodiment described above. The present variation is an example in which the donor gNB 200 changes the routing configuration of the IAB node 300 in response to a request from the IAB node 300.

In the present variation, the IAB node 300 that performs data relay from the relay source node to a plurality of relay destination nodes selects a data relay destination out of the plurality of relay destination nodes in accordance with a routing configuration configured from the donor gNB 200. The IAB node 300 transmits a routing configuration change request that changes the routing configuration to the donor gNB 200.

Figure 16:
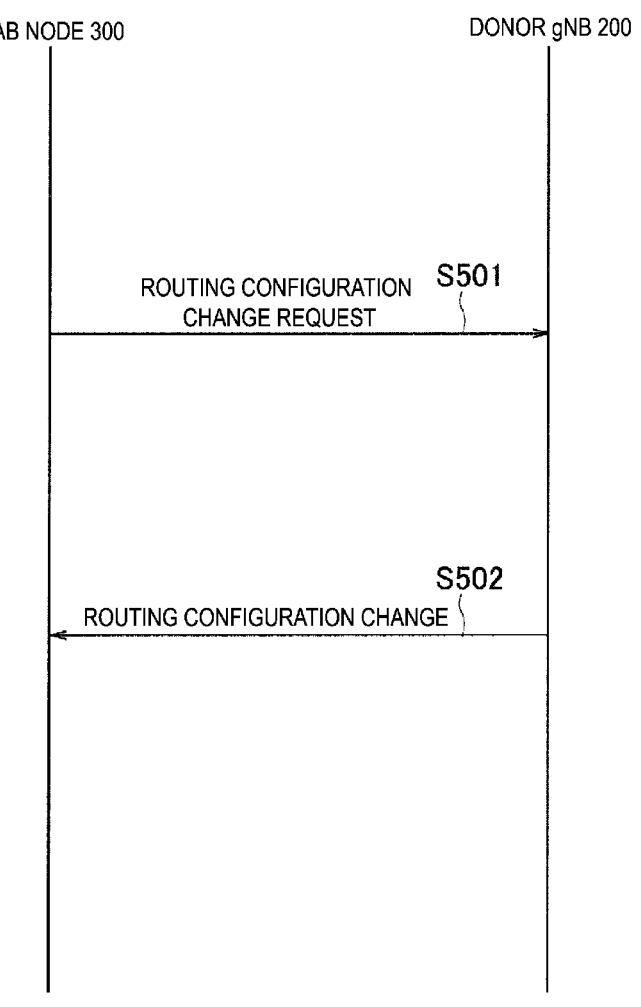
FIG. 16 is a diagram illustrating operation of variation 2 of the second embodiment.

FIG. 16 is a diagram illustrating operation of Variation 2 of the second embodiment.

As illustrated in FIG. 16, in Step S501, the IAB node 300 transmits a routing configuration change request to the donor gNB 200. The routing configuration change request may be a notification that routing change is desired. The routing configuration change request may be an RRC message or an F1 message (F1AP). The routing configuration change request may be defined individually for a case of upstream routing change and a case of downstream routing change. The routing configuration change request may be able to be transmitted only when the transmission is permitted by the donor gNB 200.

The IAB node 300 may transmit the routing configuration change request with a trigger being satisfaction of a condition the same as the start condition of the local routing described in the second embodiment described above. Which condition and determination threshold are used may be configured from the donor gNB 200 to the IAB node 300. The IAB node 300 may transmit the routing configuration change request only when transmission of the routing configuration change request is permitted (configured) by the donor gNB 200.

The routing configuration change request may include at least one selected from the group consisting of information indicating a reason (or a condition) for the need of routing configuration change, a routing ID (path ID and Destination) of a configuration change target, and an RLC Channel ID (which may be a bearer ID or an LCID) of a configuration change target.

In a case of the upstream routing change, the IAB node 300 may include a BSR value of the IAB node 300 in the routing configuration change request. When the IAB node 300 is the dual BH (dual connectivity), the BSR value may be included in the routing configuration change request for each parent node (for each path). The IAB node 300 may include, in the routing configuration change request, a BSR value of the child node of the IAB node 300 or a BSR value of the IAB node 300 taking the BSR value of the child node of the IAB node 300 into consideration. Each IAB node 300 in the IAB topology may periodically perform transmission of such a BSR value to the donor gNB 200.

In a case of the downstream routing change, the IAB node 300 may include, in the routing configuration change request, an available buffer size value of the IAB node 300 and/or an available buffer size value (Flow control feedback BAP Control PDU value) of the child node of the IAB node 300. Each IAB node 300 in the IAB topology may periodically perform transmission of such an available buffer size value to the donor gNB 200.

In Step S502, the donor gNB 200 changes the routing configuration of the IAB node 300 in response to the routing configuration change request received in Step S501. The IAB node 300 may perform handover of the IAB node 300 (i.e., IAB topology change) as necessary.

Note that the IAB node 300 may start a timer when the IAB node 300 transmits the routing configuration change request and may be suppressed from transmitting the next routing configuration change request until the timer expires.

A timer value of the timer may be configured from the donor gNB 200 to the IAB node 300.

Other Embodiments

The embodiments and variations described above can be implemented by combining different embodiments and variations with each other. Variations 1 and 2 of the second embodiment may be implemented together with the second embodiment or may be implemented separately from the second embodiment.

The embodiments and variations described above provide description by taking relay transmission performed by the IAB as an example but are not limited to this. The embodiments and variations described above may be applied to other relay transmission systems. For example, operations according to the embodiments and variations described above may be applied to a relay node (layer 3 relay node), sidelink relay (relay node that uses a sidelink used for direct communication between user equipments), and the like.

In the embodiment described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface or X2 interface).

A program may be provided that causes a computer to execute each of the processing operations according to the embodiments and the variations described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited and may be, for example, a recording medium such as a CD-ROM and a DVD-ROM. A chip set may be provided that includes a memory that stores a program for executing each of the processing operations performed by the UE 100, the gNB 200, or the IAB node 300 and a processor that executes the program stored in the memory.

Supplementary Notes

Introduction

A revised work item related to Enhancements to Integrated Access and Backhaul (NR eIAB) was approved. Some of the purposes thereof are as follows.

Enhancements of Topology Adaptation

Specification of procedures for inter-donor IAB-node migration to enhance robustness and load-balancing, including enhancements to reduce signaling load.

Specification of enhancements to reduce service interruption due to IAB-node migration and BH RLF recovery.

Specification of enhancements to topology redundancy, including support for CP/UP separation.

Enhancements of Topology, Routing, and Transport.

Specification of enhancements to improve topology-wide fairness, multi-hop latency, and congestion mitigation.

In Supplementary Notes, a first matter to be considered regarding the topology adaptation enhancements of a Rel-17 eIAB will be discussed from the viewpoint of assumption of backhaul link quality, enhancements of BH RLF indication, BH RLF recovery and cell (re) selection, and enhancements of lossless delivery.

Discussion

Assumption of Backhaul Link Quality

In the stage of research of Rel-15, as one requirement background, TR states the following: "Radio backhaul links are vulnerable to obstructions caused by a moving object such as a vehicle, change of seasons (leaves), change of infrastructure (new buildings), and the like. Such vulnerability is true for physically motionless IAB nodes as well". Thus, as has been captured in TR, various problems caused by multi-hop/radio backhaul and potential solutions for these problems were researched.

Finding 1: In the research of Rel-15, various problems caused by unstable backhaul links and potential solutions for these problems were identified, which were fully captured in TR 38.874.

In normative work of Rel-16, it was assumed that the IAB nodes are motionless, that is, "stationary IAB nodes". Accordingly, the backhaul (BH) was sufficiently stable in appropriately designed deployment even in a case of a backhaul link via millimeter waves and/or a local area IAB node that may be deployed with an unmanaged method. Thus, only a recovery procedure combined with basic functions of the BH RLF was defined. The basic functions are existing functions such as BH RLF indication (also known as type 4 that is "Recovery failure") and RRC reestablishment, MCG/SCG failure indication, and/or a conditioned handover.

Finding 2: In a Rel-16 IAB, only a stationary IAB node including a sufficiently stable backhaul link was assumed.

In enhancements of Rel-17, one intended use case is a "mobile IAB node", which may be a part of "inter-donor IAB-node migration" even if not explicitly described in WID. Secondary purposes in WID such as "enhancements to reduce service interruption due to IAB-node migration and BH RLF recovery" and "enhancements to topology redundancy" clearly intend that the BH link is not stable, and the migration and the BH RLF frequently occur in a Rel-17 deployment scenario. Therefore, according to the discussion of Rel-17, first, RAN2 should have common understanding about assumption of the BH link.

Proposal 1: RAN2 should assume that quality of the backhaul link dynamically changes. Thus, a backhaul RLF is not rare as with the Rel-17 eIAB.

Enhancements of BH RLF Indication

In email discussion of Rel-16, four types of BH RLF notifications as illustrated in FIG. 17 were discussed.

Ultimately, only "Recovery failure" being type 4 is defined as the BH RLF indication of Rel-16. With this, a child IAB-MT considers an RLF on the BH link and initiates an RLF recovery procedure.

Finding 3: In Rel-16, only "Recovery failure" being type 4 was defined as the BH RLF indication.

On the other hand, a number of companies were still considering that other types of indications were useful, and thus this was further discussed via email. Eight out of thirteen companies preferred introduction of "Trying to recover" being type 2, and other two companies thought this would be discussed in Rel-17. Accordingly, it can be assumed that a large number of companies consider that they are prepared to introduce the indication of type 2 to Rel-17. A method for transmitting the indication of type 2 requires further study. Examples of the method include using the BAP Control PDU, the SIB1, or both of these. Note that type 1 and type 2 have completely the same meaning.

Proposal 2: RAN2 should agree with the fact that "Trying to recover" being type 2 of the BH RLF indication has been introduced. Whether the transmission is performed using the BAP Control PDU, the SIB1, or both of these requires further study.

Nine out of thirteen companies agreed to hold a discussion on "BH link recovered" being type 3 in Rel-17 as well. Specifically, such an explicit indication is really needed can be studied. For example, when the indication of type 2 is transmitted via the SIB1 and the BH link is not under the RLF (i.e., "recovered"), the indication is no longer broadcast. Accordingly, downstream IAB nodes and the UE shall recognize whether the BH link has been recovered based on the absence of indication of type 2 on the SIB1. As a matter of course, when the indication of type 3 is transmitted via the BAP Control PDU, it has an advantage that the downstream IAB nodes can promptly know that the BH link has been recovered. Note that, in this case, the UE does not include the BAP layer and thus cannot know the fact. Therefore, RAN2 should discuss whether the indication of type 3 is necessary.

Proposal 3: If Proposal 3 can be agreed on, RAN2 should discuss whether to introduce an explicit BH RLF indication, that is "BH link recovered" being type 3, when the BH RLF is no longer present.

If Proposal 2 and/or Proposal 3 can be agreed on, operation during recovery of the BH link of the IAB-MT that has received the indication should be studied. The following was proposed: when the IAB-MT receives type 2, the IAB-MT reduces/stops the SR, and when the IAB-MT receives type 3 (i.e., the BH RLF is no longer present in a parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 4: RAN2 should agree with that the IAB-MT, who has received the indication of type 2 and then reduced/stopped the scheduling request, resumes the scheduling request when the BH RLF is no longer present in the parent node.

Proposal 5: RAN2 should have a discussion about when an operation of other IAB-MT is present while the parent node is trying to recover the BH link.

While the BH link of the IAB node is under the RLF, it is assumed that the IAB-DU, which transmits an indication, transmits the BH RLF indication of type 2. When an RLF occurs in the BH link, an indication is transmitted, and thus a case of the BH of single connection is easy. However, a case of the BH with duplex connection is slightly more complicated. For example, when the IAB node detects an RLF in the MCG, the IAB node initiates an MCG failure information procedure; however, the SCG continues to function as a BH link, and therefore the indication of type 2 may not need to be transmitted at this time. When the MCG failure information procedure fails due to expiry of T316 or the like, the IAB-MT initiates RRC reestablishment, and therefore at this time, the indication of type 2 is transmitted. Thus, the indication of type 2 is transmitted when RRC reestablishment is initiated, not when the MCG/SCG failure information is triggered. In any case, because this concerns operation of the IAB-DU, whether to capture this in a specification/how to capture this should be carefully studied. That is, whether to add notes in stage 2 or stage 3 or nothing needs to be captured should be studied.

Proposal 6: RAN2 should agree on the fact that the BH RLF indication of type 2 may be transmitted when the IAB-DU initiates RRC reestablishment, not when the IAB-DU initiates any of the RLF recovery procedures.

Proposal 7: RAN2 should discuss whether to capture the operation of the IAB-DU (i.e., Proposal 6) in a specification/how to capture the operation.

Enhancements of BH RLF Recovery and Cell (Re) selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 18, possible five solutions were discussed and summarized together with the rapporteur's view.

The conclusion was that "no further action is taken on this topic in Rel-16". This means that RAN2 agreed on "Option 4: Nothing needed since RRC Reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 4: In Rel-16, when the IAB node attempts an RRC reestablishment request to the descendant node, the IAB node needs to wait for a failure of the attempt, and finally go to an idle state.

In Rel-17, from the viewpoint of Proposal 1, cell (re) selection and RRC reestablishment may frequently occur. Thus, suboptimal operation, that is, operation in accordance with Finding 4, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 8: RAN2 should agree on study on optimization of cell (re) selection in order to avoid reestablishment to an inappropriate node (for example, a descendant node).

It may be assumed that a common concept in the solutions identified except for Option 4 above is that the IAB-MT is provided with a type of either a whitelist or a blacklist for the purpose of cell selection. For example, given that topology changes may frequently occur in Rel-17 due to "inter-donor IAB-node migration", the whitelist and the blacklist have advantages and disadvantages depending on the topology and the positions of the IAB nodes.

For example, from the viewpoint of an IAB node close to an IAB donor, that is, the uppermost in DAG topology, because the number of candidate nodes is small, and in some cases only an IAB donor DU, providing the whitelist is more reasonable.

However, in another example as a viewpoint of an IAB node very distant from an IAB donor, that is, the lowest in DAG topology, a great number of candidate nodes may need to be included in the whitelist. Instead, for example, a blacklist includes only downstream IAB nodes of the IAB node to be concerned and in some cases includes only a small number of child IAB nodes, and thus in this case, it has an advantage that overhead is small.

One matter of concern of the whitelist is that, due to the property of "inter-donor IAB-node migration" of Rel-17, candidate IAB nodes belonging to different/adjacent IAB topology may need to be included, which may result in increasing the size of the list. On the other hand, needless to say, downstream IAB nodes belong to the same IAB topology, and thus the blacklist need not consider the matter.

Finding 5: The whitelist and the blacklist have advantages and disadvantages depending on the topology and the positions of the IAB nodes.

Thus, when information is provided to the child IAB node for the purpose of cell selection, the IAB donor (or the parent IAB node) is desirable to be able to select either the whitelist or the blacklist. Note that the information may be useful if being reused for the purpose of cell reselection.

Proposal 9: RAN2 should agree on provision of the whitelist or the blacklist (i.e., selection structure) to the IAB-MT for the purpose of cell selection in order to avoid reestablishment to a descendant node. Whether these lists can also be used for a cell reselection procedure requires further study.

If Proposal 9 can be agreed on, a method of providing the information, that is, the whitelist or the blacklist, should be further studied. Option 1 assumes CHO configuration, and some enhancements may be required. Option 2 assumes additional indications, examples include the BH RLF indication of type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 1), that is, the fact that the parent IAB node or the IAB donor should provide a list to the child IAB node in case of occurrence of topology change, the method of providing the whitelist/blacklist should be a dynamic method. Thus, Option 5, that is, OAM, should be excluded. Which method, that is, which method out of Options 1, 2, and 3, is to be used as the baseline for the enhancements requires further study.

Proposal 10: RAN2 should agree on the fact that the parent IAB node or the IAB donor dynamically provides the whitelist/blacklist every time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, that is, lossless delivery with UL packets, was identified. As illustrated in FIG. 19, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" being a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, that is, when the stationary IAB node was used; however, it was not perfect as in FIG. 19, for example.

"Introducing UL status delivery" being a third solution was a promising solution for guaranteeing lossless delivery of UL data, with evaluation results cited in FIG. 19 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, that is, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 11: RAN2 should agree on introduction of the solution identified in TR 38.874, that is, the mechanism to guarantee lossless delivery under a condition that the topology change may frequently occur based on "UL status delivery" of some form.

The details of the third solution, that is, "Introducing UL status delivery", were discussed in two options, namely C-1 and C-2, in email discussion as illustrated in FIG. 20.

Regarding C-1 above, it is assumed that a "confirmation" from the IAB donor needs to be defined in the BAP or the RRC for end-to-end signaling forwarding via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the LAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 6: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are assumed, these are regarded as internal operations of the IAB node, and thus details thereof may not be defined.

Proposal 12: RAN2 should agree on definition of an RLC ARQ mechanism for implementing lossless delivery of the UL packets in stage 2. This delays transmission of the ACK to the child node/UE before the ACK is received from the parent IAB node (i.e., C-2). Whether to define this in stage 3/how to define this require further study.

The invention claimed is:

1. A communication control method used in a cellular communication system, the communication control method comprising:

selecting, by a relay node configured to perform data relay from a relay source node to a plurality of relay destination nodes, a first relay destination node out of the plurality of relay destination nodes in accordance with a routing configuration configured from a donor base station and information included in header of a data packet received from the relay source node, the first relay destination node being a child node of the relay node;

receiving, by the relay node, a Backhaul Adaptation Protocol (BAP) Control Protocol Data Unit (PDU) from the child node;

determining, by the relay node, if an available buffer size of the child node indicated by the received BAP Control PDU is less than a buffer size threshold; and in response to determining that the available buffer size of the child node indicated by the received BAP Control PDU is less than the buffer size threshold, executing, by the relay node, a local rerouting process to select a relay destination node different from the first relay destination node out of the plurality of relay destination nodes.

2. The communication control method according to claim 1, further comprising:

in response to a predetermined condition being satisfied, executing, by the relay node, a local rerouting process to select the relay destination node different from the first relay destination node out of the plurality of relay destination nodes, wherein the predetermined condition comprises a condition that the first relay destination node is a parent node of the relay node and that a failure occurrence notification has been received from the first relay destination node, the failure occurrence notification indicating that a radio link failure is detected for a backhaul link of the first relay destination node.

3. An apparatus for controlling a relay node configured to perform data relay from a relay source node to a plurality of relay destination nodes, the apparatus comprising a processor and a memory coupled to the processor, the processor configured to select a first relay destination node out of the plurality of relay destination nodes in accordance with a routing configuration configured from a donor base station and information included in header of a data packet received from the relay source node, the first relay destination node being a child node of the relay node, receive a Backhaul Adaptation Protocol (BAP) Control Protocol Data Unit (PDU) from the child node, determine if an available buffer size of the child node indicated by the received BAP Control PDU is less than a buffer size threshold, and in response to determining that the available buffer size of the child node indicated by the received BAP Control PDU is less than the buffer size threshold, execute a local rerouting process to select a relay destination node different from the first relay destination node out of the plurality of relay destination nodes.

4. The apparatus according to claim 3, wherein the processor is configured to:

in response to a predetermined condition being satisfied, execute, a local rerouting process to select the relay destination node different from the first relay destination node out of the plurality of relay destination nodes, the predetermined condition comprising a condition that the first relay destination node is a parent node of the relay node and that a failure occurrence notification has been received from the first relay destination node, the failure occurrence notification indicating that a radio link failure is detected for a backhaul link of the first relay destination node.

5. A relay node configured to perform data relay from a relay source node to a plurality of relay destination nodes, the relay node comprising a processor, a memory coupled to the processor, and a receiver, the processor configured to select a first relay destination node out of the plurality of relay destination nodes in accordance with a routing configuration configured from a donor base station and information included in header of a data packet received from the relay source node, the first relay destination node being a child node of the relay node, the receiver configured to receive a Backhaul Adaptation Protocol (BAP) Control Protocol Data Unit (PDU) from the child node, the processor configured to determine if an available buffer size of the child node indicated by the received BAP Control PDU is less than a buffer size threshold, and the processor configured to, in response to determining that the available buffer size of the child node indicated by the received BAP Control PDU is less than the buffer size threshold, execute a local rerouting process to select a relay destination node different from the first relay destination node out of the plurality of relay destination nodes.

6. The relay node according to claim 5, wherein the processor is configured to:

in response to a predetermined condition being satisfied, execute a local rerouting process to select the relay destination node different from the first relay destination node out of the plurality of relay destination nodes, the predetermined condition comprising a condition that the first relay destination node is a parent node of the relay node and that a failure occurrence notification has been received from the first relay destination node, the failure occurrence notification indicating that a radio link failure is detected for a backhaul link of the first relay destination node.

\* \* \* \* \*